United States Patent [19]

Jacoby et al.

[11] Patent Number: 5,310,584
[45] Date of Patent: May 10, 1994

[54] THERMOFORMABLE POLYPROPYLENE-BASED SHEET

[75] Inventors: Philip Jacoby, Naperville, Ill.; Jesse Wu, Doraville, Ga.; Mark Heiden, Sioux Falls, S. Dak.

[73] Assignee: Amoco Corporation, Chicago, Ill.

[21] Appl. No.: 868,110

[22] Filed: Apr. 14, 1992

[51] Int. Cl.$^5$ .................. B65D 71/00; B32B 7/02; B32B 27/32

[52] U.S. Cl. .................. 428/2; 428/213; 428/216; 428/36.6; 428/35.7; 428/36.92; 428/516; 426/127

[58] Field of Search .................. 428/516, 2, 213, 216, 428/36.9, 36.6, 35.7

[56] References Cited

U.S. PATENT DOCUMENTS

| | | | |
|---|---|---|---|
| 4,386,129 | 5/1983 | Jacoby | 428/215 |
| 4,405,667 | 9/1983 | Christensen et al. | 428/35 |
| 4,419,411 | 12/1983 | Park | 428/516 |
| 4,567,089 | 1/1986 | Hattori et al. | 428/213 |
| 4,680,157 | 7/1987 | Fujii et al. | 264/180 |
| 4,975,469 | 12/1990 | Jacoby et al. | 521/84.1 |

FOREIGN PATENT DOCUMENTS 3610644 10/1921 Fed. Rep. of Germany .......... C08F 110/06

OTHER PUBLICATIONS

Makromol. Chem. 109, Effect of Crystal Structure and Overstructure on Some Properties of Polypropylene by Hans Joachim Leugering.
A Thermal Study of β-Form Polypropylene by A. A. Duswalt & W. W. Cox.

*Primary Examiner*—P. C. Sluby
*Attorney, Agent, or Firm*—Matthew R. Hooper; Stephen L. Hensley

[57] ABSTRACT

The invention provides a thermoformable sheet comprising a resinous polymer of propylene and an effective amount of a beta-spherulite nucleating agent, a process for making the sheet and articles thermoformed from the sheet.

14 Claims, No Drawings

THERMOFORMABLE POLYPROPYLENE-BASED SHEET

FIELD OF THE INVENTION

The present invention relates to an improved thermoformable sheet comprising at least one layer of a resinous polymer of propylene and an effective amount of beta-spherulites, a process for preparing such sheet and to articles thermoformed from such sheets wherein such articles can be thermoformed at faster production rates and such articles can provide improved end use properties such as microwaveability and low-temperature impact resistance.

BACKGROUND OF THE INVENTION

Conventional thermoformable thermoplastic resin sheets typically are made from resins such as polyvinyl chloride, polystyrene-based resins and the like. Among these thermoplastic resins, however, polyvinyl chlorides have disadvantages in respect to hygiene, heat resistance, moisture proofness and other properties. Moreover, incineration of these materials causes emission of chlorine-containing gases. Polystyrene-based resins also show deficiencies in respect to heat resistance, impact strength, moisture-proofness and other properties. Notwithstanding these disadvantages and deficiencies, sheets of these thermoplastic resins are widely used as thermoformed packaging material in many fields.

Conventional thermoforming processes generally involve heating a thermoplastic sheet above its softening point, forming the softened sheet and allowing the formed sheet to cool and harden. Polypropylene, being a highly crystalline polymer, must be heated up to its melting temperature (Tm) of about 160° C. in order to be thermoformed by conventional thermoforming processes. The flexural modulus of polypropylene can decrease by more than two orders of magnitude at it nears its melting temperature which can thereby cause sheet made of polypropylene to undergo excessive sag during thermoforming. Also, polypropylene does not exhibit the rubbery plateau that is characteristic of glassy polymers when such polymers are heated above their glass transition temperature (Tg). Nevertheless, resinous polymers of propylene have been used increasingly in recent years in place of polyvinyl chloride and polystyrene-based resins by virtue of their excellent strength, rigidity, heat resistance, moisture proofness and other desirable properties.

The market for thermoformed plastic products has undergone rapid growth in recent years, and polypropylene-based resins have the potential to become a premium material for this market. That such resins are difficult to thermoform, as described above, has limited their use in this high-growth area. Various methods have been attempted to lessen these thermoforming difficulties.

One such method has been developed by Shell Development Co. wherein a solid phase pressure forming process, known an SPPF, is utilized. Although the SPPF process allows a hot, but not molten, sheet to be thermoformed just below its crystalline melting point, other limiting conditions are introduced such as the need for specialized, expensive thermoforming equipment, restricted depth of draw, limited draw ratio, and high levels of built-in stress.

Still other methods of attempting to overcome the thermoforming difficulties have taken the approach of tailoring the molecular weight of the polypropylene resin, thereby making it possible to process extruded sheets on conventional thermoforming equipment. In order to reduce the degree of sagging of the heated sheet as it nears its crystallization temperature, the melt flow rate of the polypropylene resin has had to be lowered to fractional values, typically less than 0.25 dg/min. The resulting high melt viscosity creates another problem; namely, that of producing sheet at economical extrusion production rates. Attempts have been made to overcome this problem by broadening the molecular weight distribution of the polypropylene to improve extrudability.

Thermoformed articles made by the processes described above depending on the products contained in them and conditions under which the articles are microwaved, can undergo change in dimensional integrity.

U.S. Pat. No. 4,680,157 discloses a method for preparing a sheet of polypropylene having excellent transparency and surface properties as well as thermoformability including a slight stretching of the sheet and optionally alpha-spherulite nucleating agents with articles vacuum thermoformed from sheet heated at 153° to 158° C.

U.S. Pat. No. 4,567,089 discloses a propylene polymer laminated sheet for surface gloss, appearance and impact resistance with a surface layer comprising crystalline polypropylene and up to 5 wt % of an inorganic or organic alpha-spherulite nucleating agent and a second layer comprising polypropylene, an ethylene polymer and an inorganic filler.

Beta-spherulite nucleating agents useful in compositions for forming unstretched films up to 0.4 mm in thickness which can be made porous by extraction of beta-spherulites, stretching the film or a combination of extraction and stretching are disclosed for the production of porous films and processes for making such films in U.S. Pat. Nos. 4,386,129 and 4,975,469, U.S. patent application (abandoned) Ser. No. 07/633,087, filed Dec. 21, 1990, in the name of P. Jacoby, et al., and U.S. Pat. No. 5,176,953 in the name of P. Jacoby, et al., all commonly assigned to the present assignee.

In spite of the showing of the use of beta-spherulite nucleating agents in the formation of microporous films and the various techniques for thermoforming sheets of polypropylene-based resins including the use of alpha-spherulite nucleating agents, there remains a need for resinous polymers of propylene which can be formed into sheet under facile conditions and competitive production rates which can be used for thermoforming articles. Such sheet would desirably also be thermoformable on conventional thermoforming equipment at increased production rates with the resultant thermoformed articles having desirable improved end-use properties such as microwaveability and low-temperature impact resistance.

Applicants have unexpectedly found that polymeric compositions comprising a resinous polymer of propylene and an effective amount of a beta-spherulite nucleating agent are useful for preparing a thermoformable sheet, particularly polypropylene-based compositions having sufficient melt flow rate for the facile and efficient production of sheet, and the thermoforming of articles from such sheet on conventional thermoforming equipment.

It is an object of this invention to provide an improved thermoformable sheet.

Another object of this invention is to provide an improved thermoformable sheet comprising a resinous polymer of propylene and an effective amount of beta-spherulites.

A further object of this invention is to provide a method for thermoforming a sheet comprising a resinous polymer of propylene and an effective amount of beta-spherulites.

A still further object of this invention is to provide articles thermoformed from such improved thermoformable beta-spherulite nucleated resinous polymers of propylene.

Advantageously, the thermoformable sheet of this invention comprises one or more layers of a crystalline resinous polymer of propylene having beta-spherulites present at a K-value of about 0.3 to 0.95 which can be thermoformed at significantly higher production rates and the sheet produces thermoformed articles which exhibit improved sidewall strength, reduced warp, and improved microwaveability compared to articles produced from conventional alpha-spherulite nucleated or non-nucleated polypropylene-based resins. Additional advantages are found in embodiments of the invention comprising multilayer sheets which include interior layers of beta-spherulite nucleated resinous polymer of propylene and exterior layers of polypropylene-based resins such as ethylene-propylene impact copolymer for improved low-temperature impact resistance.

SUMMARY OF THE INVENTION

This invention provides a thermoformable sheet comprising one or more layers of a crystalline resinous polymer of propylene having beta-spherulites present at a K-value of about 0.3 to 0.95. In another aspect the invention provides a method for thermoforming a resinous polymer of propylene-containing sheet comprising:

(a) melt forming a polymeric composition comprising a crystalline resinous polymer of propylene having alpha-spherulites and an effective amount of nucleating agent capable of producing beta-spherulites into a sheet;

(b) quenching the melt-formed sheet at a quench temperature sufficient to produce beta-spherulites wherein the beta-spherulites are present at a K-value of about 0.3 to 0.95;

(c) heating the quenched sheet to a thermoforming temperature sufficient to allow thermoforming of the sheet; and (d) thermoforming an article from the heated sheet with a thermoforming means under thermoforming conditions.

In a still further aspect, this invention provides a thermoformed article comprising one or more layers of a polymeric composition comprising a crystalline resinous polymer of propylene having alpha-spherulites and a residue of an organic beta-spherulite nucleating agent and having improved microwaveability compared to thermoformed articles comprising a resinous polymer of propylene without the organic beta-spherulite residue.

BRIEF DESCRIPTION OF THE INVENTION

Crystalline polypropylene (sometimes referred to as isotactic polypropylene) is capable of crystallizing in three polymorphic forms. In melt-crystallized material the predominant polymorph is the alpha or monoclinic form. The beta or pseudohexagonal form generally occurs at levels of only a few percent unless certain heterogeneous nuclei are present or the crystallization has occurred in a temperature gradient or in the presence of shearing forces. The third crystalline modification is the gamma or triclinic form, which is typically only observed in low-molecular weight or stereoblock fractions that have been crystallized at elevated pressures.

The alpha form also is identified herein as alpha-spherulites and alpha-crystals, while the beta form also is identified herein as beta-spherulites, beta-crystals, beta-form spherulites and beta crystallinity.

In this invention sufficient beta-spherulites are incorporated in a resinous polymer of propylene such that when a sheet is melt-formed from such polymer it is thermoformable at lower temperature and at higher production rates on conventional thermoforming equipment as compared with sheet made from alpha form nucleated or non-nucleated polypropylene. A typical way to include beta-spherulites within a resinous polymer is to incorporate one or more suitable beta-spherulite nucleating agents into the resinous polymer before the sheet is formed.

In the practice of this invention, it is preferred that nucleating agents be used to produce beta-form spherulites in the polypropylene-based resins. H. J. Leugering (Makromol. Chem. 109, p. 204 (1967)) and A. Duswalt et al. (Amer. Chem. Soc. Div. Org. Coat., 30, No. 2, 93 (1970)) disclose the use of certain nucleating agents that cause preferential formation of such beta-form spherulites.

As discussed by Duswalt et al., only a few materials are known to preferentially nucleate beta-form spherulites. These known beta-nucleators include (a) the gamma-crystalline form of a quinacridone colorant Permanent Red E3B having the structural formula

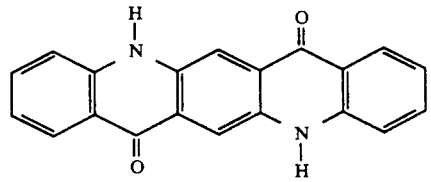

hereinafter also referred to as "Q-dye";

(b) the bisodium salt of o-phthalic acid;

(c) the aluminum salt of 6-quinizarin sulfonic acid; and to a lesser degree (d) isophthalic acid and terephthalic acid.

Also, German Patent DE 3,610,644, published Mar. 29, 1986, discloses a beta-nucleating agent prepared from two components, A and B. Component A is an organic dibasic acid such as pimelic acid, azelaic acid, o-phthalic acid, terephthalic acid, isophthalic acid and the like. Component B is an oxide, hydroxide or an acid salt of a metal of Group II such as magnesium, calcium, strontium and barium. The acid salt of component B may be derived from an organic or inorganic acid and may be a carbonate, stearate and the like. Component B may be one of the additives already added to the resinous polymer of propylene. Components A and B may each be present at up to 5 wt %, based the weight of the polymer, and especially up to 1 wt %.

The nucleating agents are ordinarily used in the form of powdered solids. To efficiently produce beta-crystallites the powder particles should be less than 5 microns in diameter and preferably no greater than 1 micron in diameter. Mixtures of the various beta-spherulite nucleating agents as well as inorganic materials such as calcium carbonate, barium sulfate, sodium chloride and the like with Q-dye can also be used.

The nucleant can be dispersed in the resinous polymer of propylene by any suitable procedure normally used in the polymer art to effect thorough mixing of a powder with a polymer resin. For example, the nucleant can be powder blended with resin in powder or pellet form or the nucleant can be slurried in an inert medium and used to impregnate or coat the resin in powder or pellet form. Alternatively, powder and pellets can be mixed at elevated temperatures by using, for example, a roll mill or multiple passes through an extruder. A preferred procedure for mixing is the blending of nucleant powder and base resin pellets or powder and melt compounding this blend in an extruder. Multiple passes through the extruder may be necessary to achieve the desired level of dispersion of the nucleant. Ordinarily, this type of procedure is used to form a masterbatch of pelletized resin containing sufficient nucleant so that when masterbatch is let down in ratios of 10/1 to 200/1 and blended with the base resin the desired level of nucleant can be obtained in the final product.

For sheet formed containing beta-spherulites, the beta-spherulite content of the sheet can be defined qualitatively by optical microscopy, or quantitatively by x-ray diffraction. In the optical microscopy method, a thin section microtomed from the sheet is examined in a polarizing microscope using crossed polars. The beta-spherulites show up as being much brighter than the alpha spherulites, due to the much higher birefringence of the beta-spherulites. For the thermoformable sheets of this invention the beta-spherulites should occupy at least 50% of the field of view.

In the x-ray diffraction method the diffraction pattern of the sheet is measured, and the heights of the three strongest alpha phase diffraction peaks, $H_{110}$, $H_{130}$ and $H_{040}$ are determined, and compared to the height of the strong beta phase peak, $H_{300}$. An empirical parameter known as "K" is defined by the equation:

$$K = (H_{300})/[(H_{300}) + (H_{110}) + (H_{040}) + (H_{130})]$$

The value of the K parameter can vary from 0, for a sample with no beta-crystals, to 1.0 for a sample with all beta-crystals.

For the thermoformable sheets of this invention, the preferred beta-spherulite nucleating agent is Q-dye present at a level of about 0.1 to about 10 ppm and the value of the K parameter should be in the range of about 0.3 to 0.95, preferably in the range of 0.4 to 0.85. Above a value of 0.95 for K, there is not sufficient alpha-spherulite content in the sheet to support the sheet and to prevent the sheet from sagging during the heating step of the thermoforming process. Below a value of 0.3 for K, insufficient beta-spherulites are present to allow facile thermoforming of the sheet at the beta phase melting temperature. The optimum range for the value of K is about 0.4 to about 0.85. For sheets having K-values of about 0.3 to 0.95, the sheet softens at a lower temperature and allows shorter cycle times to be used in the production of thermoformed articles.

Thermal analysis of the thermoformable sheet can be characterized by Differential Scanning Calorimetry (DSC) to determine the beta-spherulite nucleation effects. Parameters which are measured during the first and second heat scans of the DSC include the crystallization temperature, $T_c$, the melting temperature, $T_m$, of the alpha and beta crystal forms, and the heat of fusion, $\Delta H_f$, both the total heat of fusion, $\Delta H_f^{tot}$, and the beta melting peak heat of fusion, $\Delta H_f^\beta$. The magnitude of the $\Delta H_f^\beta$ parameter provides a measure of how much beta crystallinity is present in the sample at the start of the heat scan. Generally, the second heat $\Delta H$ values are reported, and these values represent the properties of the material after having been melted and recrystallized in the DSC at a cool-down rate of 10° C./minute. The first heat thermal scans provide information about the state of the material before the heat history of the processing step used to make the samples had been wiped out.

In greater detail, for the thermoformable sheet of this invention, various types of polyolefin resins can be used as the starting base resin with particularly satisfactory results obtained by the use of resinous polymers of propylene. Suitable resinous polymers of propylene include propylene homopolymer, random or block copolymers of propylene and ethylene or an α-olefin having 4 to 12 carbon atoms, preferably 4 to 8 carbon atoms, such as butene-1, hexene-1 and mixtures of such α-olefins. Also, blends of propylene homopolymers with other polyolefins such as high density polyethylene, low density polyethylene, linear low density polyethylene and polybutylene can be used. Preferably, the resinous polymer of propylene is selected from the group consisting of polypropylene, random or block copolymers of propylene and up to 40 mol % of ethylene or an α-olefin having 4 to 12 carbon atoms and mixtures thereof, blends of polypropylene and low density polyethylene and blends of polypropylene and linear low density polyethylene.

The resinous polymer of propylene also referred to herein as polypropylene-based resin, propylene-based polymer or resin, and in particular, polypropylene homopolymer should have a melt flow rate (MFR) as measured by ASTM-1238 which is great enough for facile and economical production of the thermoformable sheet but not so great as to produce a sheet with undesirable physical properties. Typically, the MFR should be in the range of about 0.5 to 20 dg/min and, preferably, from about 1.0 to 10 dg/min. When the MFR of the resin exceeds 20 dg/min, disadvantages are caused by the unduly low rigidity of the resin sheet with increased sagging of the sheet when being thermoformed. When the MFR is less than 0.5 dg/min, difficulties are encountered in shaping of the sheet due to the unduly high melt viscosity.

The resinous polymer of propylene can be admixed according to need with various other kinds of additives including lubricants, antioxidants, ultraviolet absorbers, radiation resistance agents, antiblocking agents, antistatic agents, coloring agents such as pigments and dyes, opacifiers such as talc and $TiO_2$, and the like in the usual quantities. Care must be taken to avoid incorporation of other nucleating agents or pigments which might act as nucleating agents since these materials may prevent the proper nucleation of beta-spherulites. Radical scavengers, such as dihydroxy talcite, should also be avoided since they have some nucleating ability. Mineral materials used as whiteners or opacifiers such as $TiO_2$ and CaCO₃ are not nucleants and do not interfere with the beta-spherulite nucleation. The effective amount of such additives will depend upon the particular application or end-use intended for the articles thermoformed from the sheet and can range from 0.005 to about 5 wt %, based on the weight of the polymer. Suitable stabilizers are the usual stabilizing compounds for polypropylene and other α-olefin polymers. Preferably, for opaque, white thermoformed articles TiO₂ or CaCO₃ is added to the beta-nucleated resinous polymer of propylene at a level of about 0.5 to about 5 wt %.

Preferred antistatic agents are alkali metal alkane sulfonates, polyether-modified, i.e. ethoxylated and/or propoxylated, polydiorganosiloxanes and/or substantially linear and saturated, aliphatic tertiary amines containing a $C_{10-20}$ aliphatic radical and substituted by two $C_{1-4}$ hydroxyalkyl groups, among which N,N-bis-(2-hydroxyethyl)-alkyl amines containing $C_{10-20}$ and preferably $C_{12-18}$ alkyl groups are particularly suitable.

Suitable antiblocking agents are inorganic additives, such as silicon dioxide, calcium carbonate, magnesium silicate, aluminum silicate, calcium phosphate and the like, nonionic surfactants, anionic surfactants and/or incompatible organic polymers, such as polyamides, polyesters, polycarbonates and the like. Examples of lubricants are higher aliphatic acid amides, higher aliphatic acid esters, waxes and metal soaps.

The melting point of the beta-form spherulites of polypropylene-based resins is generally about 144° to 148° C., contrasted with the typical melting point range of alpha-form spherulites of about 159° to 163° C. When extruded sheet containing beta-spherulites is heated above the melting point of the beta-spherulite crystals, but below the melting point of the alpha-spherulites, the sheet becomes soft enough to thermoform, and the unmelted alpha-spherulite crystals in the sheet act to reinforce the sheet against sagging before and during the thermoforming step. As the thermoformed article cools, the melted part of the polypropylene-based resin recrystallizes as the higher melting alpha form so that there are essentially no beta crystals present in the thermoformed articles, thus allowing the thermoformed article to have the same high temperature physical properties as articles thermoformed from non-beta-spherulite nucleated polypropylene.

Some beta-form nucleated resinous polymer of propylene sheet has been shown to have reduced optical properties. Also, at Q-dye levels above about 2 ppm the thermoformed articles exhibit a "pinkish" color to the human eye. Excellent opaque, white thermoformed articles can be prepared from such sheet by adding TiO₂ since such addition does not interfere with the formation of beta-spherulites. Q-dye has also been shown to be quite effective at the 0.5 ppm level in inducing high levels of beta crystallinity, and at this concentration in thermoformed articles it is virtually undetectable to the human eye. Also, intensive compounding of the resin and dye in a twin screw extruder has been shown to reduce the color imparted to the final resin at a given dye concentration. Other potential beta nucleating agents that are colorless can be used.

After formation of a homogeneous composition of a resinous polymer of propylene and an effective amount of a beta-spherulite nucleating agent, the composition can be used in the method of this invention for thermoforming a resinous polymer of propylene-containing sheet comprising the steps of:

(a) melt forming a polymeric composition comprising a crystalline resinous polymer of propylene having alpha-spherulites and an effective amount of a nucleating agent capable of producing beta-spherulites into a sheet;

(b) quenching the melt-formed sheet at a quench temperature sufficient to produce beta-spherulites at a concentration corresponding to a K-value of about 0.3 to 0.95;

(c) heating the quenched sheet to a thermoforming temperature sufficient to allow thermoforming of the sheet; and (d) thermoforming an article from the heated sheet with a thermoforming means under thermoforming conditions.

The resinous polymer of propylene used in this method is selected from the group consisting of polypropylene, random or block copolymers of propylene and up to 40 mol % of ethylene or an α-olefin having 4 to 12 carbon atoms and mixtures thereof, blends of polypropylene and low density polyethylene and blends of polypropylene and linear low density polyethylene.

The beta-spherulite nucleating agent useful in the method of this invention is any inorganic or organic nucleating agent which can produce beta-spherulites in the melt-formed sheet at a concentration corresponding to a K-value of 0.3 to 0.95. We have found that quinacridone colorant Permanent Red E3B is particularly effective as a beta-spherulite nucleating agent when present at a level of about 0.1 to about 10 ppm, based on the weight of the resinous polymer of propylene, and which has the structural formula:

In a broader sense, the thermoformable sheet need not be limited to one layer but can be two-layered, three-layered or more than three layers. Conventionally, multi-layer and single layer sheets can be melt formed by coextrusion and extrusion, respectively, by various known shaping methods such as the calender method, the extrusion method and the casting method. Among these, the melt extrusion slit-die or T-die process is especially preferred. Extruders used in such a melt-extrusion process can be single-screw or twin-screw extruders. Preferably, such machines should be free of excessively large shearing stress and be capable of kneading and extruding at relatively low resin temperatures.

In the preparation of the thermoformable sheet by the slit-die, T-die or other suitable processes, the extruded sheet in the form of molten polymer is quenched or cooled to solidify the molten sheet by a suitable quenching means such as a single quench roll or a multi-roll quench stack such as a 2-roll, a 3-roll or a 5-roll quench stack and the like. The quenching means must be capable of quenching the sheet at a rate equal to or greater than the sheet production rate and the temperature encountered by the sheet in the quenching means must be in a range suitable to promote the development of beta-spherulites. Preferably, a 3-roll vertical quench stack is used with the sheet nipped between the top and middle rolls with the beta-spherulite crystallinity starting at the middle roll and the sheet wrapping around the middle and bottom rolls. The temperature of the middle roll should be at least 80° C., preferably in the range of 90° to 130° C., for optimum production of beta-spherulites. For a single layer sheet having beta-spherulites throughout the sheet the temperature of the bottom roll should be in the range of about 80° to 110° C. However, if a single layer sheet with a very small amount of beta-spherulites near the sheet surfaces and a larger amount of beta-spherulites near the center is desired, the bottom roll temperature should be less than 80° C. The temperature of the top roll of the 3-roll stack is less critical and can range from 60° to 120° C. without adversely affecting the beta-form content of the sheet. The quenching means should be positioned relatively close to the extruder die, the distance being dependent on factors such as the temperature of the rolls, the sheet extrusion rate, the sheet thickness, and the roll speed. Generally, the distance from the die to the roll is about 0.25 to 5 cm. The quenching step can be overdriven relative to the rate of extruded sheet production to effect a drawdown of the extruded sheet. Since sheet made by this process is drawn in only one direction, strength properties are not balanced in the machine and transverse directions.

For producing coextruded multi-layer sheet having beta-spherulite nucleated resinous polymer of propylene as one layer, one extruder may be used to extrude a sheet of the beta-spherulite nucleated resin and a second extruder used to extrude a layer of non-nucleated polymer resin as a layer on at least one side of the nucleated resin layer with the resin layers contacted between nip rolls. If a layer of non-nucleated resin is desired on both sides of the beta-nucleated resin then the non-nucleated polymer melt can be split between two slit-dies and a second layer of extruded sheet contacted with the other side of the beta-nucleated polymer resin layer between a second set of nip rolls. Alternatively, more than one extruder can be used to supply molten polymer to a coextrusion die which allows two or more distinct polymer layers to be coextruded from a given slit-die. The temperature at the die exit should be controlled by use of a die-lip heater to the same or slightly higher temperature than the resin melt temperature in order to prevent "freeze-off" of the polymer at the die lip. The die should be free of mars and scatches on the surface so as to give a sheet having smooth surfaces.

The single layer sheet or multi-layer sheet prepared by extrusion, lamination or other means can have a thickness which is thick enough to be thermoformed without sagging too much during thermoforming and not too thick as not to be able to be thermoformed into an acceptable part. Typically, the thermoformable sheet of this invention has a thickness of 0.25 mm or greater and ranges from about 10 to about 200 mils. The multi-layer sheets can have a construction in which the beta-nucleated polymer resin occupies from about 10 to about 99.9 percent of the sheet thickness and the non-nucleated polymer resin occupies from about 90 to about 0.1 percent of the sheet thickness. Preferably, for three-layer sheet, the inner layer is the beta-nucleated polymer and occupies about 50 to about 99.5 percent of the sheet thickness and the outer two layers are non-nucleated polymer and occupy from about 0.5 to about 50 percent of the sheet thickness. The outer layers can have substantially equal or different thicknesses. Preferably, the outer layers each have a thickness of about 0.01 to about 0.1 mm and the intermediate layer has a thickness of about 0.23 to about 4.5 mm. Such multi-layer sheet can have a combination of different resins by the use of two or more extruders. The resinous polymers of propylene for the multi-layer sheet can be, for example, polypropylene homopolymer, random or block polymerized ethylene-propylene copolymer, polypropylenes having different melt flow rates, a polypropylene and an adhesive polyolefin modified with an unsaturated carboxylic acid or a derivative thereof, a polypropylene and a polyethylene or an ethylene-vinyl acetate copolymer, a polypropylene and an ethylene-vinyl alcohol copolymer, beta-spherulite nucleated polypropylene and polypropylene, and the like. For thermoformable sheet or thermoformed articles of three or more layers, an inner layer may be employed as a tie layer to join together exterior polymer layers or the inner layer can be a gas/chemical barrier layer to provide gas or chemical resistance. Alternatively, such multi-layer sheets can be formed by other known means such as the lamination of roll stock sheets together by heat and/or adhesive tie layers, by lamination of roll stock to a sheet as it is being extruded and the like.

With respect to multi-layer thermoformable sheet thermoformed into articles providing gas and chemical barrier protection, the barrier layer typically employs a polymer matrix such as poly(ethylene vinyl alcohol) (EVOH), various high nitrile polymers such as poly(vinylidene chloride) and the like as the polar polymer and a polymer such as a polyolefin as a moisture resistant, non-polar polymer.

As a gas/chemical barrier polymer, EVOH polymers can be used with an ethylene content varying from 29 to 44 mol %. Typical copolymers used are EVAL grades supplied by Kuraray Col, Ltd., Soarnol grades supplied by Nippon Gohsei and Selar OH grades supplied by DuPont Co. Other barrier polymers include high nitrile polymers such as Barex 210 and Barex 218 (high acrylonitrile-methyl acrylate copolymers grafted onto a preformed poly(butadiene-acrylonitrile) elastomer); high acrylonitrile-styrene co- and terpolymers; high acrylonitrile-indene co- and terpolymers; and, homo-, co- or terpolymers high in methacrylonitrile content. Another class of barrier polymers which can be used is that derived from all common homo-, co-, or terpolymers based on vinylidene chloride.

Representative examples of other barrier type polymers include poly(vinyl chloride); methyl methacrylate-styrene copolymers grafted onto a diene elastomer; amorphous polyamides such as Trogamid T, crystalline polyamides such as nylon-6 and nylon-66; polyesters such as polyethylene terephthalate and poly(ethylene 2,6-naphthalene dicarboxylate); polyurethanes; polycarbonates; polyphenylene oxide; polyphenylene oxide/-polystyrene blends; polystyrene; polyetherimide and polyalkyl methacrylates.

Polymers for the inner layer can be selected for other functions such as, for instance, to provide systems with high-temperature resistance characteristics. In that case, polymers that can be employed are selected from the group consisting of polycarbonate, polyethylene terephthalate, poly(ethylene 2,6-naphthalate dicarboxylate), polyphenylene oxide, polysulfone, polyetherimides, thermoplastic polyimides and polybenzimidazoles. The additional polymer layer for the inner layer should not adversely affect the improved thermoforming characteristics of the beta-spherulite containing resinous polymers of propylene. Preferably, the intermediate layer additionally comprises a crystalline resinous polymer of propylene and a residue of an organic beta-spherulite nucleating agent or an ethylene vinyl alcohol copolymer.

Particular polymer composition combinations can be used for one or both of the outer two layers for sheets of three or more layers. For a thermoformable sheet comprising an intermediate layer of the beta-spherulite-containing resinous polymer of propylene and two outer layers of a thermoplastic resin, the resinous polymer of propylene is selected from the group consisting of polypropylene, random or block copolymers of propylene and up to 40 mol % of ethylene or an α-olefin having 4 to 12 carbon atoms and mixtures thereof, blends of polypropylene and low density polyethylene and blends of polypropylene and linear low density polyethylene and the thermoplastic resin is selected from the group consisting of polypropylene, random or block copolymers of propylene and up to 40 mol % of ethylene or an α-olefin having 4 to 12 carbon atoms, blends of polypropylene and low density polyethylene, blends of polypropylene and linear low density polyethylene, a block ethylene-propylene copolymer having an ethylene content of about 1 to 20 wt %, blends of ethylene-propylene rubber polymer and high density polyethylene and blends of ethylene-propylene rubber polymer and low density polyethylene.

For example, impact modified polypropylene copolymers can be used for the outer layers and beta-nucleated material can be used for the middle layer to produce a thermoformable sheet with increased thermoforming rate and thermoformed articles with improved low temperature impact resistance.

For optimum formation of beta-spherulites in the melt-formed sheet the quench temperature of step (b) is about 90° to about 130° C. The thermoforming temperature of step (c) should be sufficient to melt the beta-spherulites but not the alpha-spherulites. Typically, the beta-spherulite form of polypropylene has a melting point of about 144° to 148° C. and the alpha-spherulite form of propylene has a melting point of about 159° to 163° C. By heating the quenched sheet to a temperature in the range of about 144° to 148° C., the beta-spherulites soften and allow thermoforming of the sheet. The alpha-spherulites remain in the solid phase, provide integrity to the sheet and prevent excessive sagging of the sheet during thermoforming.

In a particular embodiment of the method of this invention when the thermoforming temperature of step (c) is less than the melting temperature of the beta-spherulites of 144° to 148° C., the thermoformed article of step (d) can exhibit a tendency to undergo "microvoiding". By microvoiding is meant the formation of very small voids within the sidewalls of the thermoformed articles. This microvoiding produces an opaque, white thermoformed article without the presence of a filler. The sidewalls of these containers have a density from about 2 to about 20% less than the sheet from which they were formed. Although the microvoiding provides a less dense sidewall the article still has integrity and vapor barrier properties.

The thermoformable sheet of this invention can be thermoformed by conventional thermoforming equipment and processes including thermoforming in-line with a sheet casting extruder or off-line using a roll-fed thermoformer. Conventional thermoforming processes include vacuum forming, pressure forming, plug assist pressure forming and matched-mold thermoforming which are described in The Encyclopedia of Polymer Science & Engineering, John Wiley & Sons, Vol. 16, p. 807-832, 1989. Such thermoforming is the process of manufacturing products from thermoplastic sheet generally involving the sequential steps of (a) heating a thermoplastic sheet until it softens, (b) forming the softened sheet under the influence of gravity, pressure and/or vacuum in a mold, and (c) allowing the formed sheet to cool, harden and be die cut from the sheet, stacked and packaged. Variations of basic thermoforming include processing cut-to-size, roll-feed, or in-line extruded sheet; materials of sheet heating such as metal-sheath radiant heaters, quartz radiant heating panels, ceramic heaters, convection ovens, contact heating and the like; type of mold; vacuum or air pressure forming; trim in place or separately; and packaging. For the method of thermoforming sheet of this invention generally lower pressures can be used as compared to the thermoforming of non-beta-nucleated polypropylene sheet. Also, the method of thermoforming of this invention can be done in-line during the preparation of the thermoformable sheet or it can be done off-line from rolls of sheet material. Preferred thermoforming processes include vacuum forming and plug assist pressure forming.

Various combinations of polymers and layers can be used in combination with the beta-nucleated crystalline resinous polymers of propylene to form the thermoformable sheet and thermoformed articles of this invention. For example, in multi-layer sheet with beta-nucleated material as the intermediate layer, the intermediate layer can additionally comprise an ethylene vinyl alcohol copolymer or regrind material comprising a crystalline resinous polymer of propylene and a residue of an organic beta-spherulite nucleating agent such as Q-dye.

Such sheet can be thermoformed at lower temperatures and at faster cycle times relative to that required for resinous polymers of propylene containing no beta-spherulite nucleating agent. Under these thermoforming conditions of lower temperature and faster cycle time, sheet sag is less of a problem and less heat is needed to be removed from the sheet thereby producing a more rapid set-up of the thermoformed article and allowing wider unsupported sheet to be used in the thermoforming operation.

Thermoformed articles of this invention typically are used in applications including: automotive applications such as bumpers, truck-bed liners, fender wells, door panel inserts, glove box doors, and the like; consumer items such as luggage, trays, storage trailers, ice cooler liners, ice cube trays, toys, signs, and the like; appliance applications such as refrigerator door liners, freezer panels and the like; housewares such as cups, shower stalls, sinks, tubs, and the like; recreational materials such as boat hulls, golf cart canopies, bicycle wheel covers, hoods and shrouds for skimobiles an be containers and lids for containers for foods and beverages in general; and the like and packaging applications such as food containers including such items as yogurt cups, margarine tubs, cottage cheese containers, deli containers, frozen food trays, lids, and the like, meat trays, fast food disposables, and the like. Also, articles having a deeper draw and formed from thicker sheets can be made. Preferred thermoformed articles are food containers and articles having low-temperature impact resistance.

X-ray diffraction data was determined on specimens taken from various locations on thermoformed articles made from different resins. No evidence of the beta diffraction peak was observed for any of the thermoformed samples. It is known that when beta phase is melted without melting the remaining alpha phase, the molten polymer recrystallizes as the alpha phase only. This occurs because the un-melted alpha crystals direct the re-crystallization process. Therefore, the thermoformed articles contain virtually no beta crystallinity and the article has the same temperature properties as the non-beta-nucleated material. Although the thermoformed articles contain virtually no beta-spherulites, the beta-spherulite nucleating agent and residue of the nucleating agent remain in the article so that the article can be analyzed for the nucleating agent. Alternatively, thermoformed articles made from beta-nucleated material can be reground and formed into sheet having beta-spherulites if quenched under appropriate conditions described above. Thus regrind material can be used by itself or in continuation with virgin beta-nucleated material with the proviso that such materials are sufficiently compatible and that the regrind material does not contain material which might interfere with the nucleation of beta-spherulites.

The following examples further elaborate the present invention although it will be understood that these examples are for purposes of illustration and are not intended to limit the scope of the invention.

EXAMPLES 1–4 AND CONTROL EXAMPLE A

Cast sheets were made from nucleated polypropylene resins containing different levels of beta-spherulite nucleating agent. The beta nucleant was a red quinacridone dye, E3B, commercially available from Hoechst-Celanese. A masterbatch of Q-dye at a level of 200 ppm was prepared as a powder blend of Q-dye with polypropylene powder having a MFR as determined by ASTM D1238 of 3.1 dg/min. The masterbatch was let down to final concentrations of 1.0, 1.5 and 2.0 ppm of Q-dye in a polypropylene resin having a MFR of 3.1 dg/min. The resin blends were stabilized with 0.18 wt %, based on the weight of the resin, of a stabilizer package of a hindered phenol, a phosphonite, and calcium stearate and pelletized with a 63.5 mm Prodex extruder. The above resins as well as a control polypropylene resin having a MFR of 2.5 dg/min and no beta nucleant were processed into cast sheet on a 38 mm Davis Standard extruder cast sheet line with the following processing conditions:

| | |
|---|---|
| Polymer melt temperature, °C. | 227 |
| Extruder screw rotation speed, rpm | 25 |
| Extruder die gap, mm | 0.508 |
| Sheet production rate, m/s | 0.017 |
| Sheet thickness, mm | 0.406 |
| Chill roll temperature, °C. | 108 |
| Air knife pressure, psi | 40 |

Example 1 was prepared from a polypropylene composition having a Q-dye concentration of 1.0 and Examples 2 and 3 had Q-dye concentrations of 1.0 and 2.0 ppm, respectively. Control Example A had no Q-dye. Example 4 had the same polypropylene and Q-dye concentration as Example 3 except that the extruder screw rpm was increased from 25 to 40 rpm and the sheet production rate increased from 0.017 to 0.028 m/s. Both the polypropylene-based compositions and the sheet were characterized by DSC. The beta crystal content of the examples of sheet was characterized from the determination of the K-value from x-ray diffraction measurements. Because the sheets were thick enough to possibly be anisotropic, x-ray diffraction measurements were taken on both the air-knife and chill-roll sides of each sheet. The polymer composition properties are summarized in Table I including Q-dye concentration, composition MFR, melting temperature of the alpha-spherulite phase, $T_m{}^\alpha$, melting temperature of the beta-spherulite phase, $T_m{}^\beta$, and crystallization temperature, $T_c$. The sheet properties are summarized in Table II, including K-value and crystallinity on both the air-knife and chill-roll sides of each sheet.

TABLE 1

| | Polymer Composition Properties | | | |
|---|---|---|---|---|
| | Example | | | |
| Property | 1 | 2 | 3 and 4 | Control A |
| Q-dye, ppm | 1.0 | 1.5 | 2.0 | 0 |
| MFR, dg/min | 3.10 | 3.20 | 2.85 | 2.55 |
| $T_m{}^\alpha$, °C. | 157.7 | 157.8 | 158.3 | NM |
| $T_m{}^\beta$, °C. | 144.7 | 144.6 | 145.2 | NM |
| Tc, °C. | 116.5 | 115.3 | 116.6 | NM |

NM - not measured

TABLE II

| | Sheet Properties | | | | |
|---|---|---|---|---|---|
| | Example | | | | |
| Property | 1 | 2 | 3 | 4 | Control A |
| K-value Air-knife side | 0.374 | 0.489 | 0.639 | 0.743 | 0.203 |
| Chill-roll side | 0.484 | 0.562 | 0.748 | 0.876 | 0.283 |
| Crystallinity, % Air-knife side | 53 | 55 | 59 | 63 | 54 |
| Chill-roll side | 57 | 61 | 64 | 66 | 56 |

EXAMPLES 5–8

Polypropylene-based compositions containing four different levels of Q-dye, NA-10 nucleant (sodium bis(4-t-butylphenyl)phosphate) and a control with no nucleant were prepared from nucleated polypropylene resin stabilized with 0.18 wt %, based on the weight of the resin, of commercially available antioxidants and processing stabilizers as described in Examples 1–4. The compositions were melt compounded and pelletized on a 63.5 mm Prodex extruder. After compounding and pelletizing, 5 wt % of a TiO₂ pellet concentrate, polypropylene resin with 50 wt % TiO₂, was dry blended with each of the resin compositions. The resin blends were then compounded and extruded into a 40 mil thick sheet on a 63.5 mm D NRM PMIV sheet extrusion line. The temperatures for the 3-roll vertical quench stack in the extrusion line were 110° C. for the top roll and 104° C. for the middle and bottom rolls.

The composition of Example 5 had a Q-dye concentration of 0.5 ppm. The compositions of Examples 6, 7 and 8 had Q-dye concentrations of 1.0, 2.0 and 4.0 ppm, respectively. Control Example C had a composition with no Q-dye added. Control Example D had NA-10 nucleating agent present at a level of 850 ppm. The polypropylene-based resins and extruded sheets were characterized by DSC and x-ray diffraction. The polymer composition properties are summarized in Table III including Q-dye composition, melting temperature of the alpha-spherulite phase, $T_m{}^\alpha$, melting temperature of the beta-spherulite phase, $T_m{}^\beta$, crystallization temperature, $T_c$, total heat of fusion $\Delta H_f{}^{tot}$ and heat of fusion of the beta phase melting peak, $\Delta H_f{}^\beta$. The extruded sheet properties including thermal properties for first and second heat scans of DSC are summarized in Table IV.

TABLE III

Polymer Composition Properties

| Property | Example 5 | 6 | 7 | 8 | Control B | Control C |
|---|---|---|---|---|---|---|
| Nucleant type | Q-dye | Q-dye | Q-dye | Q-dye | None | NA-10 |
| Level, ppm | 0.5 | 1.0 | 2.0 | 4.0 | None | 850 |
| Tc, °C. | 114.4 | 113.5 | 115.8 | 119.2 | 108.0 | 127.6 |
| $T_m^\alpha$, °C. | 157.3 | 157.7 | 157.9 | 158.4 | 158.3 | 160.6 |
| $T_m^\beta$, °C. | 143.8 | 144.2 | 144.2 | — | — | — |
| $\Delta H_f^{tot}$, cal/g | 18.9 | 19.4 | 19.6 | 20.4 | 20.4 | 20.6 |
| $\Delta H_f^\beta$, cal/g | 0.2 | 2.1 | 0.1 | — | — | — |

TABLE IV

Extruded Sheet Properties

| Property | Example 5 | 6 | 7 | 8 | Control B | Control C |
|---|---|---|---|---|---|---|
| First Heat | | | | | | |
| Tc, °C. | 115.6 | 117.6 | 118.6 | 120.9 | 110.3 | 128.4 |
| $T_m^\alpha$, °C. | 161.7 | 164.1 | 161.2 | 164.5 | 161.8 | 161.8 |
| $T_m^\beta$, °C. | 146.6 | 147.5 | 146.8 | 146.5 | 145.0 | — |
| $\Delta H_f^{tot}$, cal/g | 19.4 | 19.1 | 19.2 | 19.4 | 19.4 | 20.3 |
| $\Delta H_f^\beta$, cal/g | 2.5 | 2.1 | 1.6 | 0.4 | 0.2 | — |
| Second Heat | | | | | | |
| $T_m^\alpha$, °C. | 160.2 | 162.0 | 161.3 | 162.6 | 159.9 | 162.3 |
| $T_m^\beta$, °C. | 146.4 | 145.8 | 148.4 | — | 145.3 | — |
| $\Delta H_f^{tot}$, cal/g | 20.6 | 20.6 | 21.3 | 21.4 | 19.4 | 21.7 |
| $\Delta H_f^\beta$, cal/g | 0.9 | 0.2 | — | — | — | — |

From the data in Tables III and IV, the parameters of greatest interest from the thermal analysis relative to nucleation effects are the crystallization temperature Tc, and the heat of fusion of the beta melting peak, $\Delta H_f^\beta$. As the density of nucleation centers increased, Tc increased. The magnitude of the $\Delta H_f^\beta$ parameter provides a measure of how much beta crystallinity is present in the sample at the start of that heat scan. Generally, the second heat $\Delta H$ values are reported, and these are representative of the properties of the material after having been melted and re-crystallized in the DSC at a cool-down rate of 10° C./minute. The first-heat thermal scans provide information about the state of the material before the heat history of the processing step used to make the samples had been wiped out.

From the second heat scan data in Tables III and IV, it can be seen that the polymer compositions showed a peak in beta crystallinity at the 1.0 ppm nucleant level, while the extruded sheet showed this peak at a beta nucleant content at the 0.5 ppm level. The trend of the existence of a maximum level of beta crystallinity with increasing nucleant concentration is believed to be due to Q-dye nucleating both alpha and beta crystalline forms of polypropylene. The alpha form begins to crystallize before the beta form, and can dominate the morphology if a sufficiently high concentration of nucleant particles is not present. The level of beta crystallinity that develops depends not only on nucleant concentration, but also on the degree of dispersion of the nucleant particles and the thermal conditions used to crystallize the material. The sample made from the extruded sheet differed in two ways from the base resin sample. Firstly, the sheet sample had undergone an additional compounding step, and this may have served to alter the dispersion of the nuclei particles. Secondly, the sheet sample contained 2.5% $TiO_2$, and this may have also affected the crystallization behavior.

The important effect of thermal history on the crystalline morphology of the sample can be seen by comparing the first and second heat scans of the extruded sheet samples. It can be seen that the first heat scans of Examples 5, 6 and 7, with beta-nucleant levels of 0.5, 1.0 and 2.0 ppm, respectively, all have prominent beta melting peaks relative to the other sheet samples. This result suggests that the beta content maximum is broader for the sheets as compared to the resins, and extends from Q-dye levels of 0.5–2.0 ppm. It is also noteworthy that low levels of beta crystallinity are seen in the unnucleated Example Control B, and no evidence of a beta phase is seen for the conventionally alpha-form nucleated material Example Control C.

Articles were thermoformed from the extruded sheets of Examples 5, 6 and 7 and Control Examples B and C using a Plastiform Labform Model 1620 PVICP thermoformer with a 12 ounce "cottage cheese" cup mold. The thermoformer heater was set at three different settings: 315° C. (600° F.), 371° C. (700° F.) and 427° C. (800° F.). The thermoforming evaluation was performed at three different heater settings with the 427° C. setting being the standard setting used to evaluate the thermoformability of polypropylene. The lower the heater temperature, the longer the cycle times that were required to produce acceptable looking cups. At each temperature, heating times were varied to determine an upper limit, best operating range, and lower limit heating times. The lower limit value represents the minimum time needed to produce an acceptable part wherein uniformity of wall thickness and sharp duplication of mold contours define the criteria of an acceptable part. Above the limit of the upper time the sheet becomes too soft, and excessive draw-down and sticking of the sheet to the plug was observed.

The x-ray data obtained on the extruded sheet samples are summarized in Table V. X-ray measurements were performed on both sides of the sheet because the thermal history of the two sides were somewhat different. From this data it can be seen that the highest levels of beta crystallinity as measured by the K-value were for the sheets that contained 0.5, 1.0, and 2.0 ppm of Q-dye, which is consistent with the thermal data discussed above. Example 8 containing 4.0 ppm of Q-dye showed a large discrepancy in the K-value from one side of the sheet to the other, suggesting that this material was particularly sensitive to differences in thermal history.

Resins which showed the greatest degree of mold filling were Examples 5, 6 and 7. These are the Examples which exhibited the highest K-values and the highest amount of beta crystallinity on the first heat DSC scans. The sample with the poorest degree of mold filling was the conventionally alphaform nucleated resin, Control C, which had no beta crystallinity evidenced by x-ray or thermal analysis. Control B, which had a low level of beta crystallinity, had intermediate mold filling behavior. Clearly the thermoformability of these sheets at low heating times accurately mirrors the level of beta crystallinity that is present in the sheet.

The optimum thermoforming window data for these resins at the 427° C. heater setting are given in Table VI and demonstrates that a broader processing window exists for Examples 5, 6 and 7 for those resins whose extruded sheets contained the highest level of beta crystallinity. Similar data obtained at heater settings of 316° and 371° C. are also summarized in Table VI.

TABLE V

X-Ray Data on Extruded Sheets

| Property | Example 5 | 6 | 7 | 8 | Control B | Control C |
|---|---|---|---|---|---|---|
| Nucleant type | Q-dye | Q-dye | Q-dye | Q-dye | None | NA-10 |
| Level, ppm | 0.5 | 1.0 | 2.0 | 4.0 | None | 850 |
| K-Value |  |  |  |  |  |  |
| Bottom side of sheet | 0.71 | 0.60 | 0.50 | 0.57 | 0.29 | 0 |
| Top side of sheet | 0.77 | 0.67 | 0.67 | 0.31 | 0.22 | 0 |

TABLE VI

Thermoformer Heater Settings Evaluation

| Thermoforming Time, sec. | Example 5 | 6 | 7 | 8 | Control B | Control C |
|---|---|---|---|---|---|---|
| 316° C. |  |  |  |  |  |  |
| Upper Limit | 46 | 46 | 46 | 46 | 46 | 47 |
| Optimum Range | 40–44 | 40–44 | 40–44 | 40–44 | 40–44 | 40–46 |
| Lower Limit | 38 | 38 | 38 | 38 | 38 | 38 |
| Window | 8 | 8 | 8 | 8 | 8 | 9 |
| 371° C. |  |  |  |  |  |  |
| Upper Limit | 31 | 30 | 31 | 31 | 30 | 30 |
| Optimum Range | 25–30 | 25–29 | 25–30 | 26–30 | 26–29 | 26–29 |
| Lower Limit | 24 | 24 | 24 | 25 | 15 | 25 |
| Window | 7 | 6 | 7 | 6 | 5 | 5 |
| 427° C. |  |  |  |  |  |  |
| Upper Limit | 21.5 | 21.5 | 21.5 | 20.5 | 21 | 22 |
| Optimum Range | 19–21 | 18–21 | 18–21 | 18.5–20 | 20–20.5 | 20–21 |
| Lower Limit | 18 | 18 | 18 | 18 | 19 | 19 |
| Window | 3.5 | 3.5 | 3.5 | 2.5 | 2 | 3 |

EXAMPLES 9-11

Polypropylene-based compositions were prepared from nucleated polypropylene resin stabilized with 0.18 wt %, based on the weight of the resin, of a stabilizer package of a hindered phenol, a phosphonite, and calcium stearate. These compositions contained two different concentrations of Q-dye or a concentration of an alpha-spherulite nucleant, NA-10 (sodium bis(4-t-butylphenyl)phosphate) and were prepared as described in Example 1. These compositions were melt compounded and pelletized on a Japan Steel Works CIM extruder. After compounding and pelletizing, $TiO_2$, in the form of a 50 wt % $TiO_2$ concentrate (P-8555 available from A. Schulman Co.) was added to the composition to obtain a 1 w % level $TiO_2$. The compositions were extruded into various thickness sheets. The Example 9 composition had a Q-dye concentration of 0.75 ppm and no $TiO_2$. Example 10 had a Q-dye concentration of 0.75 ppm and 1 wt % of $TiO_2$. The Example 11 composition had a Q-dye concentration of 1.5 ppm and Control Example D had a non-beta-spherulite nucleating agent concentration or 850 ppm. The 70 mil sheet was extruded on a 89 mm Welex extruder using a 3-roll quench stack with a top roll temperature range of 71.7 to 73.3° C., a middle roll temperature range of 101.1° to 102.8° C. and a bottom roll temperature range of 79.4° to 80.6° C. Sheets with thickness of 17 mill, 25 mils and 48 mils were extruded using a 3-roll stack on a 114 mm Welex extruder with a top roll temperature of 60° C., a middle roll temperature range of 97.8° to 102.8° C. and a bottom roll temperature range of 81.1° to 85.6° C.

Off-line thermoforming of the 25 mil sheet was done on an Armac thermoformer with a rectangular tray mold. Off-line thermoforming of the 48 mil sheet was done on a Gabler 743 thermoformer with a 16 ounce deli cup mold and lids for the 16 ounce cup were made on the Gabler lid thermoformer using the 17 mil sheet.

Off-line extrusion was performed on a Welex 114 mm extruder to produce sheets having thicknesses of 17, 25 and 48 mils. These sheets were thermoformed, respectively, into lids for 16 ounce containers, rectangular trays and 16 ounce deli cups. All of these sheets were made from the polymer compositions with 2 wt % of the P-8555 $TiO_2$ for a $TiO_2$ final content of 1%.

The major differences in the sheet appearance involved the slight pink coloration of the Example 9 and 10 sheets, and the somewhat lower level of gloss on the bottom side of these two beta-nucleated sheets. The bottom side of the sheet was the side in contact with the middle chrome roll, and a microscopic examination of sections cut from the sheet showed a higher concentration of beta spherulites on this side of the sheet. The beta spherulites probably created minor imperfections on this side of the sheet, which were responsible for the lower gloss.

A subsequent x-ray analysis of samples taken from these sheets was performed to characterize the distribution of crystal types. The K-values obtained on both the top and bottom surfaces of each sheet are given in Table VII. The Control D sheets contained no beta crystals. For sheets made from the beta nucleated resins, Examples 9, 10 and 11, the beta crystal content was generally higher on the bottom side of the sheet. This effect was probably due to the higher temperature that the bottom side of the sheet experienced in contact with the middle roll. For the 25 mil thick sheets one sheet with no $TiO_2$ was also made and its K-values were almost identical with that of the Example 9 sheet made from the same resin after $TiO_2$ was added, indicating that there was little or no influence of the $TiO_2$ on crystal nucleation but the $TiO_2$ did contribute to a more uniformly white, opaque sheet. For the 25 mil thick sheet, increasing the Q-dye level from 0.75 to 1.5 ppm had a very marginal effect on the K-value. The 17 mil thick sheet had the lowest K-values and this may have been due to the higher line speed and shorter contact time of this sheet with the middle chrome roll. The 48 mil thick sheet had a high K-value of 0.79 that was the same on both sides of the sheet.

Trays using 25 mil thick sheet from Example 11 were made using standard conditions of 14.5 cycles per minute (cpm). Under these conditions the trays looked quite acceptable. When the production rate was speeded up above 15 cpm, some loss of sidewall definition was observed. Trays made from Example 9 sheet appeared to have better material distribution than Example 11 trays, and speeds above 16 cpm with no loss in sidewall definition were obtained. The beta nucleated sheets afforded a 10-15% improvement in the production rate of articles on this thermoformer, and gave a tray with better overall material distribution and sidewall strength, compared to neat polypropylene resin. Lids for 16 ounce cups were made using 17 mil sheet from Example 11 resin in the Gabler lid machine. This machine was operated at a maximum speed of 15 cpm using nonbeta-nucleated polypropylene resin. At higher speeds warping of the lids was observed. With Example 11 sheet speeds were obtained up to 20 cpm with no warping, for a productivity increase of 33%. The 16 ounce containers were thermoformed from the 48 mil thick sheet using the Gabler 743 thermoformer. Thermoforming was started with neat polypropylene sheet at speeds of 14.9 cpm. When the process was switched over to Example 9 sheet, the appearance of the containers improved dramatically. Production rates were achieved up to 18 cpm with excellent material distribution and no visible warp. The cups made from this sheet had a shiny outside appearance, with more of a matte type finish on the inside. Here the outside of the cup corresponded to the top side of the extruded sheet. When the sheet roll was flipped over, so that the top side of the sheet became the inside of the cup, the matte finish was seen on the outside of the container.

VIII. In terms of sidewall profile cups made from the beta nucleated resin at 16, 17, and 18 cpm showed improved wall thickness relative to neat polypropylene. The increase in cycle rate from 14.9 to 18 cpm for the beta nucleated resin, did not produce a significant dropoff in any of the critical properties of the container.

TABLE VIII

Measured Properties - 16 Ounce Deli Bowl

| Example | Measurement Value Spec | Weight (g) | Crush (lbs) | Diameter (in) | Height (in) | Warp (in) | Underrim | Thickness Profile (in) Side-Wall | Bottom | Corner |
|---|---|---|---|---|---|---|---|---|---|---|
| Control 14.9 cpm | Ave. | 11.16 | 23.70 | 4.557 | 3.163 | 0.0187 | 0.0152 | 0.0097 | 0.0298 | 0.0047 |
|  | SD | 0.123 | 3.88 | 0.014 | 0.017 | 0.0257 | 0.0025 | 0.0010 | 0.0034 | 0.0009 |
| Example 9 16 cpm | Ave. | 11.31 | 34.88 | 4.565 | 3.142 | 0.0069 | 0.0163 | 0.0118 | 0.0296 | 0.0061 |
|  | SD | 0.124 | 4.00 | 0.006 | 0.004 | 0.0049 | 0.0016 | 0.0007 | 0.0018 | 0.0008 |
| Example 9 17 cpm | Ave. | 11.31 | 29.77 | 4.565 | 3.139 | 0.0095 | 0.0141 | 0.0122 | 0.0303 | 0.0062 |
|  | SD | 0.09 | 4.69 | 0.006 | 0.005 | 0.0044 | 0.0016 | 0.0008 | 0.0013 | 0.0008 |
| Example 9 18 cpm | Ave. | 11.36 | 34.14 | 4.563 | 3.134 | 0.0079 | 0.0156 | 0.0116 | 0.0299 | 0.0058 |
|  | SD | 0.14 | 3.04 | 0.006 | 0.004 | 0.0044 | 0.0019 | 0.0008 | 0.0018 | 0.0010 |

TABLE VII

| Example | Sheet Side | TiO2 | Type | Level, ppm | Sheet Thickness, mils | K Value | Bottom Roll Temp. °C |
|---|---|---|---|---|---|---|---|
| 9 | Top | No | Q-dye | 0.75 | 25 | 0.69 | 79 |
| 9 | Bottom | No | Q-dye | 0.75 | 25 | 0.84 | 79 |
| 10 | Top | Yes | Q-dye | 0.75 | 25 | 0.69 | 79 |
| 10 | Bottom | Yes | Q-dye | 0.75 | 25 | 0.86 | 79 |
| 11 | Top | Yes | Q-dye | 1.5 | 25 | 0.76 | 79 |
| 11 | Bottom | Yes | Q-dye | 1.5 | 25 | 0.88 | 79 |
| 11 | Top | Yes | Q-dye | 1.5 | 17 | 0.49 | 83 |
| 11 | Bottom | Yes | Q-dye | 1.5 | 17 | 0.62 | 83 |
| Control D | Top | Yes | NA-10 | 850 | 25 | 0 | 83 |
| Control D | Bottom | Yes | NA-10 | 850 | 25 | 0 | 83 |
| 10 | Top | Yes | Q-dye | 0.75 | 48 | 0.79 | 86 |
| 10 | Bottom | Yes | Q-dye | 0.75 | 48 | 0.79 | 86 |
| Control D | Top | Yes | NA-10 | 850 | 48 | 0 | 86 |
| Control D | Bottom | Yes | NA-10 | 850 | 48 | 0 | 86 |

Various analyses were performed on these 16 ounce cups, and a summary of the results is given in Table VIII.

Tests were performed on these containers using both water and spaghetti sauce in a microwave oven at a setting of High for 5 minutes. The containers made from the compositions containing 0.75 ppm Q-dye, Example 9, exhibited virtually no warpage or distortion following the microwaveability test, whereas the containers made from the sheet of Control Example D were significantly distorted during the test. This difference in behavior is believed to be due to lower molded-in stress in the containers thermoformed from the beta-nucleated sheet due to the beta phase being melted prior to thermoforming.

EXAMPLE 12

A multi-layer thermoformable sheet was prepared having polypropylene homopolymer composition with no beta-spherulite nucleation for the two outer or skin layers and a beta-spherulite nucleated polypropylene homopolymer composition as the middle or core layer. Both compositions were stabilized with 0.18 wt %, based on the weight of the polymer, of a stabilizer package of a hindered phenol, a phosphonite, and calcium stearate. The composition of the skin layer was 12-5013 grade of polypropylene, available from Amoco Chemical Company, and had a MFR of 3.8 dg/min. The polypropylene-based resin of the composition of the core layer was a polypropylene homopolymer having a MFR of 3.0 dg/min and a beta-spherulite nucleating agent of 0.75 ppm of Q-dye. The compositions were melt compounded and pelletized at conventional polypropylene operating conditions using a Japan Steel Works CIM extruder. After compounding and pelletizing, 5 wt %, based on the weight of the polymer, of P-8555, a concentrate of 50 wt % $TiO_2$, was added to the compositions. The core layer of the multi-layer sheet was extruded using a 89 mm Welex extruder and the skin layers were extruded using a 63.5 mm extruder. The total thickness of the sheet was 48 mils including a 2 mil thick skin layer on each side of the core layer. The three-layer sheet was extruded onto a three-roll quench stack with temperatures measured on the surface of the rolls of: top roll, 74° C.; middle roll, 98° C., and bottom roll, 82° C. Dynatup impact strength was measured on the extruded sheet at a temperature of −20° C. with a measured peak load of 41.3 lbs and a measured peak energy of 0.21 ft-lbs.

EXAMPLE 13

A three-layer thermoformable sheet was prepared by the same process conditions and equipment as described in Example 12. The composition of the core layer was 50 wt % of a polypropylene homopolymer having a MFR of 3.0 dg/min and 0.75 ppm Q-dye nucleating agent and 50 wt % of a normal 50/50 regrind blend of 3.0 dg/min MFR polypropylene resin with residual levels of 0.75 ppm and 1.5 ppm Q-dye nucleating agent. The composition of the skin layers was an impact ethylene-propylene copolymer, grade PD7292N from Exxon, having a MFR of 3.5 dg/min. Dynatup impact strength was measured on the extruded sheet at a temperature of $-20°$ C. with a measured peak load of 206.8 lbs and a measured peak energy of 2.08 ft-lbs.

The sheets of Examples 12 and 13 were thermoformed using a 16 ounce deli cup mold with both in-line and off-line thermoforming processes. During off-line thermoforming of both Example 12 and Example 13 sheets, production rates of 18 cpm and greater were achieved. The containers produced from the sheet of Examples 12 and 13 had excellent appearance, good contour definition and good sidewall distribution. The 18 cpm production rate represents a 20.8% increase in production compared to the typical production rate of 14.9 cpm for non-nucleated polypropylene compositions with the 16 ounce deli cup mold. Various analyses were performed on these 16 ounce cups, and a summary of the results is given in Table IX.

Microwave oven tests were performed on the containers of Example 12. Fifteen of the 16 oz deli containers of Example 12 produced at a rate of 18.1 to 18.3 cpm containing water were placed in a microwave oven at a setting of High for 5 minutes. All 15 containers held up well without any visible indication of warpage or shrinkage. Fifteen of the 16 oz deli containers of Example 12 produced at the 18.7 cpm production rate containing water were placed in a microwave oven for 5 minutes on a setting of High. Bottoms on some of these containers "bubbled out" after the microwave test. Containers produced at the higher thermoforming rate of 18.7 cpm appear acceptable for one-time use. The higher thermoforming rate achieved using the coextruded sheet with the core layer of beta-spherulite nucleated polypropylene demonstrated the improved thermoformability of such coextruded sheet. The 16 ounce bowls produced from both Example 12 and 13 sheets had no detectable pink coloration to the human eye and only a slight hint of pink coloration when a number of the bowls were stacked together.

Microwave oven and freeze drop tests were performed on the containers of Example 13. Twenty containers thermoformed at a production rate of 15-18 cpm were packed with 340 g of product, sealed, frozen in a freezer at about $-18°$ C., removed from the freezer and dropped from a three foot height onto a concrete floor. The containers held up well during the test with some trays landing on their corners and some bouncing and flipping over. None of the tested 20 containers cracked. These containers were then subjected to a microwave oven test with eight minutes on a setting of high. All of the microwaved containers held up well and retained an excellent appearance.

EXAMPLE 14 AND CONTROL EXAMPLES E-K

The composition of Examples 14 and control Examples E-K compare the beta-spherulite nucleating efficiency of Q-dye to other beta nucleating agents and to controls with no nucleating agent. All of the nucleants were in the form of fine powders. The nucleants and 0.18 wt % based on the weight of the polymer of a stabilizer package, were added to various resinous polymers of propylene and compounded using a 19 mm Brabender extruder. The Brabender extruder was also used to cast sheets from a 15.2 cm wide slit die and a 3-roll quench stack with a center cast roll temperature of 90° C.

Control Example E was prepared from a polypropylene homopolymer having a nominal MFR of 2.0 dg/min and a nucleating agent composed of 50/50 blend by weight of terephthalic acid and calcium oxide at levels of 1, 10, and 100 ppm.

Control Example F was prepared from a polypropylene homopolymer having a nominal MFR of 2.0 dg/min and a nucleating agent composed of a 50/50 blend by weight of azelaic acid and barium oxide at levels of 1, 10, 100 and 1000 ppm.

Control Example G was prepared from a polypropylene having a nominal MFR of 2.0 dg/min and no nucleating agent.

Control Example I was prepared from a blend of resinous polymers of propylene 27.4 wt % of polypropylene homopolymer having a nominal MFR of 2.0 dg/min, 50 wt % of an ethylene-propylene block copolymer having an ethylene content of 40 wt %, and a nominal MFR of 1.0 dg/min, 5 wt % of a low molecular weight polypropylene having a melt viscosity of 112 poise measured at 190° C. and at a shear rate of 136 $sec^{-1}$ and 17.6 wt % $CaCO_3$.

Control Example H was prepared from a polypropylene homopolymer having a nominal MFR of 2.0 dg/min and a nucleating agent composed of a 50/50

TABLE IX

| | | | | Measured Properties - 16 Ounce Deli Bowl | | | | | | |
|---|---|---|---|---|---|---|---|---|---|---|
| | Measurement Value Spec | Weight (g) | Crush (lbs) | Diameter (in) | Height (in) | Warp (in) | Thickness Profile (in) | | | |
| Example | | | | | | | Underrim | Side-Wall | Bottom | Corner |
| Example 12 18.1-18.3 cpm | Ave. | 11.40 | 26.5 | 4.54 | 3.145 | NM | 0.0123 | 0.0112 | 0.0267 | 0.0056 |
| | SD | 0.11 | 3.7 | 0.03 | 0.011 | NM | 0.0014 | 0.0009 | 0.0019 | 0.0010 |
| Example 12 18.7 cpm | Ave. | 12.38 | 31.2 | 4.56 | 3.172 | 0.017 | 0.0159 | 0.0119 | 0.0235 | 0.0053 |
| | SD | 0.20 | 4.5 | 0.02 | 0.017 | 0.016 | 0.016 | 0.0009 | 0.002 | 0.0012 |
| Example 13 15-18 cpm | Ave. | 11.54 | 30.9 | 4.56 | 3.138 | NM | 0.0150 | 0.0112 | 0.0292 | 0.006 |
| | SD | 0.16 | 5.0 | 0.03 | 0.005 | NM | 0.0021 | 0.0009 | 0.003 | 0.0008 |
| Example 13 18.7 cpm | Ave. | 12.26 | 30.2 | 4.52 | 3.177 | 0.015 | 0.0178 | 0.0141 | 0.0266 | 0.005 |
| | SD | 0.17 | 4.0 | 0.07 | 0.019 | 0.019 | 0.0026 | 0.0012 | 0.0022 | 0.0009 |

SD standard deviation
NM Not measured blend by weight of 1000 ppm azelaic acid and 1000 ppm CaCO₃.

Control Example J was prepared from the blend of resinous polymers of propylene of Control Example I and 1000 ppm of azelaic acid.

Control Example K was prepared from the blend of resinous polymers of propylene of Control Example I and a 50/50 blend by weight of 1000 ppm barium oxide and 1000 ppm of azelaic acid.

Example 14 was prepared from the blend of resinous polymers of propylene of Control Example I and 2 ppm of Q-dye.

The results of Differential Thermal Colorimetry and x-ray diffraction measurements for Example 14 and Control examples E-K are summarized in Table X.

In Control Examples E and F, polypropylene homopolymer was blended with 1, 10, and 100 ppm of either terephthalic acid with CaO, or azelaic acid with BaO. No elevation of the Tc value was observed with either nucleant system, and only trace amounts of beta crystallinity were detected on the second heat scan. The two samples containing 100 ppm of either nucleant were compression molded into thin films and examined under crossed polars. Large alpha-type spherulites were seen, with only a scattering of beta spherulites.

In another study, levels of 1000 ppm of different nucleants were used and blends were made up using both polypropylene homopolymer, as well as a blend containing polypropylene homopolymer, ethylene-propylene block copolymer, low molecular weight polypropylene. As controls, blends were also prepared with no nucleant present, and one sample contained 2 ppm of the Q-dye. One of the filled samples was made with only the azelaic acid present, since a high level of CaCO₃ was already there by virtue of the filler particles. The DSC and x-ray data on these Control Examples are given in Table X.

The DSC data shows that the un-nucleated resins had Tc values in the range of 115°-116° C., and none of the mixed oxide/acid nucleants showed any significant elevation of this value. Only the sample with the Q-dye showed a significant rise in the Tc value, and a significant beta melting peak. The x-ray data on the cast films showed that only the presence of the Q-dye produced a significant rise in the K-value.

TABLE X

Nucleating Agent Comparison

| Property Nucleant | Control E | | | Control F | | | |
|---|---|---|---|---|---|---|---|
| Type | TA/CaO | | | AzA/BaO | | | |
| Level, ppm | 1 | 10 | 100 | 1 | 10 | 100 | 1000 |
| Tc, °C. | 112.8 | 112.7 | 112.6 | 112.3 | 112.1 | 11.25 | 116.7 |
| $T_m^\alpha$, °C. | 158.2 | 158.5 | 158.6 | 158.3 | 158.7 | 158.1 | 160.0 |
| $T_m^\beta$, °C. | 144.3 | 144.9 | 144.8 | 144.8 | 144.7 | 144.1 | 146.2 |
| $\Delta H_f^{tot}$, cal/g | 21.0 | 21.3 | 21.5 | 21.4 | 21.2 | 21.2 | 21.7 |
| $\Delta H_f^\beta$, cal/g | 0.2 | Tr | Tr | Tr | 0.1 | Tr | 0.5 |
| K-value | NM | NM | NM | NM | NM | NM | 0.16 |

| Property Nucleant | Cont. G | Control H | Cont. I | Cont. J | Control K | Ex. 14 |
|---|---|---|---|---|---|---|
| Type | None | AZA/CaCO₃ | None | AzA | AzA/BaO | Q-dye |
| Level, ppm | — | 1000/1000 | — | 1000 | 1000/1000 | 2 |
| Tc, °C. | 116.0 | 116.2 | 115.3 | 115.4 | 115.2 | 120.9 |
| $T_m^\alpha$, °C. | 159.8 | 160.6 | 160.4 | 159.4 | 158.2 | 160.2 |
| $T_m^\beta$, °C. | 146.2 | 146.8 | 145.8 | 145.2 | 144.7 | 147.7 |
| $\Delta H_f^{tot}$, cal/g | 22.4 | 22.2 | 10.1 | 10.0 | 10.1 | 10.5 |
| $\Delta H_f^\beta$, cal/g | 0.4 | 0.3 | Tr | 0.1 | 0.1 | 2.6 |

TABLE X-continued

Nucleating Agent Comparison

| K-value | 0.11 | 0.15 | 0.16 | 0.06 | 0.06 | 0.72 |
|---|---|---|---|---|---|---|

TA - Terephthalic acid
AzA - Azelaic acid
Tr - Trace amount detected
NM - Not Measured

We claim:

1. A thermoformable sheet comprising a crystalline resinous polymer of propylene having beta-spherulites present at K-value of about 0.3 to 0.95.

2. The thermoformable sheet of claim 1 wherein said beta-spherulites are included within said resinous polymer by incorporating a beta-spherulite nucleating agent into said resinous polymer before said sheet is formed.

3. The thermoformable sheet of claim 2 wherein said beta-spherulite nucleating agent is present at a level of about 0.1 to about 10 ppm and has the structural formula:

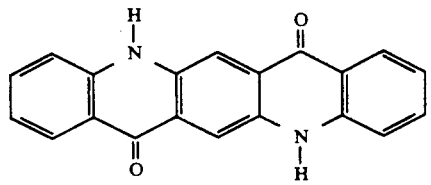

4. The thermoformable sheet of claim 3 wherein said resinous polymer of propylene is selected from the group consisting of polypropylene, random or block copolymers of propylene and up to 40 mol % of ethylene or an α-olefin having 4 to 12 carbon atoms and mixtures thereof, blends of polypropylene and low density polyethylene and blends of polypropylene and linear low density polyethylene.

5. The thermoformable sheet of claim 4 comprising three layers, wherein one of the layers is disposed as an intermediate layer between the other two of said layers, said intermediate layer being comprised of said beta-spherulite-containing resinous polymer of propylene, and said other two layers being comprised of a thermoplastic resin.

6. The thermoformable sheet of claim 5 having a thickness of about 0.25 mm or greater and wherein said intermediate layer has a thickness of about 0.23 to about 4.5 mm and said other two layers each have a thickness of about 0.01 to about 0.1 mm.

7. The thermoformable sheet of claim 6 wherein said thermoplastic resin is selected from the group consisting of polypropylene, random or block copolymers of propylene and up to 40 mol % of ethylene or an α-olefin having 4 to 12 carbon atoms, blends of polypropylene and low density polyethylene, blends of polypropylene and linear low density polyethylene, a block ethylene-propylene copolymer having an ethylene content of about 1 to 20 wt %, blends of ethylene-propylene rubber polymer and high density polyethylene and blends of ethylene-propylene rubber polymer and low density polyethylene.

8. The thermoformable sheet of claim 7 wherein said intermediate layer additionally comprises ethylene vinyl alcohol copolymer.

9. The thermoformable sheet of claim 7 wherein said intermediate layer additionally comprises a regrind material comprising a crystalline resinous polymer of propylene and a residue of an organic beta-spherulite nucleating agent.

10. The thermoformable sheet of claim 7 in the form of a thermoformed article having improved low-temperature impact resistance.

11. The thermoformable sheet of claim 1 in the form of a thermoformed food container.

12. A thermoformed article, obtained from a thermoformable sheet, said article comprising a polymeric composition comprising a crystalline resinous polymer of propylene having alpha-spherulites and a residue of an organic beta-spherulite nucleating agent, wherein said thermoformable sheet, prior to thermoforming, comprises a crystalline resinous polymer of propylene having beta-spherulites present at a K-value of about 0.3 to 0.95.

13. The article of claim 12 wherein said residue comprises

and is present in said article in an amount of about 0.1 to about 10 ppm.

14. The thermoformed article of claim 12 comprising three layers, wherein one of said layers is disposed as an intermediate layer between the other two of said layers, said intermediate layer being comprised of said beta-spherulite-containing resinous polymer of propylene, and said other two layers being comprised of a thermoplastic resin selected from the group consisting of polypropylene, random or block copolymers of polypropylene and up to 40 mol % of ethylene or an α-olefin having 4 to 12 carbon atoms, blends of polypropylene and low density polyethylene, and blends of polypropylene and linear low density polyethylene.

* * * * *

REEXAMINATION CERTIFICATE (3734th)

United States Patent [19]

Jacoby et al.

[11] B1 5,310,584

[45] Certificate Issued Feb. 16, 1999

[54] THERMOFORMABLE POLYPROPYLENE-BASED SHEET

[75] Inventors: Philip Jacoby, Naperville, Ill.; Jesse Wu, Doraville, Ga.; Mark Heiden, Sioux Falls, S. Dak.

[73] Assignee: Amoco Corporation, Chicago, Ill.

Reexamination Request:
No. 90/003,598, Oct. 11, 1994

Reexamination Certificate for:
Patent No.: 5,310,584
Issued: May 10, 1994
Appl. No.: 868,110
Filed: Apr. 14, 1992

[51] Int. Cl.[6] .......................... B65D 71/00; B32B 7/02; B32B 27/32
[52] U.S. Cl. .......................... 428/2; 426/127; 428/35.7; 428/36.6; 428/36.92; 428/213; 428/216; 428/516
[58] Field of Search .................. 428/2, 213, 216, 428/35.7, 36.6, 36.92, 516

[56] References Cited

U.S. PATENT DOCUMENTS

| | | | |
|---|---|---|---|
| 3,367,926 | 2/1968 | Voeks | 260/93.5 |
| 4,386,129 | 5/1983 | Jacoby | 428/215 |
| 4,511,610 | 4/1985 | Yazaki et al. | 428/35 |
| 4,842,951 | 6/1989 | Yamada et al. | 428/516 |
| 5,026,778 | 6/1991 | Fujii et al. | 525/210 |
| 5,149,579 | 9/1992 | Park et al. | 428/213 |
| 5,176,953 | 1/1993 | Jacoby et al. | 428/315.5 |
| 5,209,892 | 5/1993 | Breidt, Jr. et al. | 264/544 |
| 5,231,126 | 7/1993 | Shi et al. | 524/296 |

FOREIGN PATENT DOCUMENTS

88105614  9/1990  China.

OTHER PUBLICATIONS

Winkel et al, "Extrusion, Thermoforming and Stretch–Blow–Molding of Polypropylene", Advances in Polymer Technology, vol. 2, No. 2, pp. 107–140 (1982).

Irwin, "Thermoforming—Introduction to Thermoforming", Modern Plastics Encyclopedia, pp. 286–294 (1988).

Kuhro et al, "Crystallization–Modified Polypropylene", SPE Journal, Oct., 1964, pp. 1113–1119.

*Primary Examiner*—D. S. Nakarani

[57] ABSTRACT

The invention provides a thermoformable sheet comprising a resinous polymer of propylene and an effective amount of a beta-spherulite nucleating agent, a process for making the sheet and articles thermoformed from the sheet.

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claims 1 and 12 are determined to be patentable as amended.

Claims 2–11, 13 and 14, dependent on an amended claim, are determined to be patentable.

1. A thermoformable sheet *having a thickness of greater than 0.25 mm* comprising a crystalline resinous polymer of propylene *including alpha spherulites and* having beta-spherulites present at K-value of about 0.3 to 0.95, *said sheet being thermoformable by a process of heating the sheet to a temperature sufficient to melt beta-spherulites but not alpha spherulites, and thereafter forming the sheet under the influence of gravity, pressure or vacuum.*

12. A thermoformed article, obtained from a thermoformable sheet *having a thickness of greater than 0.25 mm*, said article comprising a polymeric composition comprising a crystalline resinous polymer of propylene having alpha-spherulites and a residue of an organic beta-spherulite nucleating agent, wherein said thermoformable sheet, prior to thermoforming, comprises a crystalline resinous polymer of propylene having beta-spherulites present at a K-value of about 0.3 to 0.95, *said sheet being thermoformed by a process of heating the sheet to a temperature sufficient to melt beta-spherulites but not alpha spherulites, forming the sheet under the influence of gravity, pressure or vacuum in a mold, allowing the formed sheet to cool and harden, and die cutting the article from the sheet.*

* * * * *